United States Patent
Glingener et al.

(10) Patent No.: US 6,819,412 B2
(45) Date of Patent: Nov. 16, 2004

(54) MEASUREMENT METHOD FOR DETERMINING THE NONLINEARITIES IN AN OPTICAL FIBER

(75) Inventors: Christoph Glingener, Feldkirchen-Westerham (DE); Erich Gottwald, Holzkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/311,166

(22) PCT Filed: May 22, 2001

(86) PCT No.: PCT/DE01/01975

§ 371 (c)(1),
(2), (4) Date: Dec. 4, 2002

(87) PCT Pub. No.: WO01/94905

PCT Pub. Date: Dec. 13, 2001

(65) Prior Publication Data

US 2003/0128946 A1 Jul. 10, 2003

(30) Foreign Application Priority Data

Jun. 7, 2000 (DE) .......................................... 100 28 144

(51) Int. Cl.[7] .............................................. G01N 21/00
(52) U.S. Cl. .................................................... 356/73.1
(58) Field of Search .............. 356/73.1, 44; 385/12–14, 385/27–31; 250/227.11, 227.18; 398/9–38

(56) References Cited

U.S. PATENT DOCUMENTS 4,560,246 A * 12/1985 Cotter ........................... 385/27
5,592,282 A * 1/1997 Hartog ........................... 356/44
6,072,614 A   6/2000 Roberts
6,542,228 B1 * 4/2003 Hartog ........................... 356/73.1

FOREIGN PATENT DOCUMENTS

DE           43 14 189       11/1994

OTHER PUBLICATIONS

Y. Namihira et al., "Nonlinear coefficient measurements for dispersion shifted fibres using self phase modulation method at 1.55 μm", Electronics Letters, 1994, vol. 30, pp. 1171–1172.
Govind, "Nonlinear Fiber Optics", Academic Press, 1995, pp. 370–375.
Kawakani et al, "Overmodulation of Intensity modulated Signals due to stimulated Brillouin scattering", Electronic Letters, vol. 30, pp. 1507–1508.
Agrawal, "Nonlinear Fiber Optics" 1995, Kapitel 9.2.1.
Agrawal, "Nonlinear Fiber Optics", Academic Press, 1995, Formel (9.2.6).

* cited by examiner

Primary Examiner—Tu T. Nguyen
(74) Attorney, Agent, or Firm—Bell Boyd & Lloyd LLC

(57) ABSTRACT

A measurement method is provided for determining nonlinearities in an optical fiber wherein, in a first step, at least one optical test signal is injected into the optical fiber, whose test signal power is varied, and a first onset threshold for the stimulated Brillouin scatter is determined on the basis of the change in power of the back scattered optical signal and, in a second step, in addition to the optical test signal, at least one modulated optical pump signal is injected with a predetermined pump signal power and at a first pump wavelength into the optical fiber, and a second onset threshold for the stimulated Brillouin scatter is determined on the basis of the change in the test signal power, and the nonlinearity coefficient of the optical fiber is determined by evaluating at least the first and the second onset threshold, the test and pump signal parameters and the fiber parameters.

9 Claims, 3 Drawing Sheets

MEASUREMENT METHOD FOR DETERMINING THE NONLINEARITIES IN AN OPTICAL FIBER

BACKGROUND OF THE INVENTION

Nonlinear effects, such as self-phase modulation, cross-phase modulation and four-wave mixing, are known in optical transmission systems; in particular, in transmission systems which operate on the WDM principle (wavelength division multiplexing). These cause signal distortion in the optical signal to be transmitted in the optical fiber. Nonlinear effects such as these in an optical fiber can be described by the nonlinearity coefficient.

In order to determine the nonlinearity coefficient of an optical fiber, the publication by Y. Namihira, A. Miyata, N. Tanahashi, "Nonlinearity coefficient measurements for dispersion shifted fibres using self-phase modulation method at 1.55 $\mu$m", Electronic Letters, 1994, Vol. 30, No. 14, pages 1171–1172, for example, discloses a measurement arrangement in which the nonlinearity characteristics of an optical fiber are determined by using the self-phase modulation method. Measurement methods such as these are dependent on access to the start and end of the optical fibers to be measured, although this involves considerable measurement effort and is virtually impossible in already existing optical communications networks; that is to say, in optical fibers which have already been laid. In addition, a separate return channel is required from the fiber end to the fiber start in order to transmit the measured information.

An object to which the present invention is directed is to improve the determination of the nonlinearities in an optical fiber, and to allow the nonlinearities of an optical fiber to be measured at one end; that is to say, at the start or at the end of the optical fiber.

SUMMARY OF THE INVENTION

A major aspect of the measurement method according to the present invention is that, in a first step, at least one optical test signal is injected into the optical fiber, whose test signal power is varied, and a first onset threshold for the stimulated Brillouin scatter is determined on the basis of the change in power of the backscattered optical signal. Furthermore, in a second step, in addition to the optical test signal, at least one modulated optical pump signal is injected with a predetermined pump signal power and at a first pump wavelength into the optical fiber, and a second onset threshold for the stimulated Brillouin scatter is determined on the basis of the change in the optical test signal power. Finally, the nonlinearity coefficient of the optical fiber is determined by evaluation of at least the first and the second onset threshold, of the test and pump signal parameters, and the fiber parameters. It is particularly advantageous that the measurement method according to the present invention makes it possible to determine the nonlinearity coefficient via a measurement at only one end; that is to say, at the receiving end or transmitting end. This is an enormous advantage, particularly for the determination of the fiber nonlinearities of optical fibers which have already been laid.

In a second embodiment of the measurement method for determining the nonlinearities in an optical fiber, in a first step, at least one optical test signal is injected with a test signal power and at a test signal wavelength into the optical fiber, and the power of the backscattered optical signal is measured, and a first ratio is formed from the injected test signal power and the power of the backscattered optical signal. Furthermore, in a second step, in addition to the optical test signal which has a test signal power and is at a test wavelength, at least one modulated optical pump signal is injected with an adjustable pump signal power and at a first pump wavelength into the optical fiber, and the power of the backscattered optical signal is measured, and a second ratio is determined from the injected test signal power and the power of the backscattered optical signal. Here, the adjustable pump signal power of the modulated optical pump signal is increased or decreased until the second ratio matches the first ratio. In this case, the nonlinearity coefficient of the optical fiber is then determined by evaluation of the test and pump signal parameters as well as the fiber parameter. The variation according to the present invention of the pump signal power of the modulated optical pump signal alternatively makes it possible to determine the nonlinearity coefficient of the optical fiber by ratio formation, evaluating the observed fiber parameters and trial parameters.

A further advantage of the measurement method according to the present invention is that the test and pump signal parameters which are evaluated on the basis of the first variant of the measurement method according to the present invention are the test signal wavelength, the predetermined pump signal power, the first pump wavelength and the modulation frequency of the optical pump signal. Furthermore, the test signal power, the test signal wavelength, the pump signal power that is set, the first pump wavelength, and the modulation frequency of the optical pump signal are evaluated as the test and pump signal parameters; crucial for the second embodiment of the measurement method according to the present invention.

Theoretical principles relating to the measurement method according to the present invention for determination of the nonlinearities and the dispersion in an optical fiber will be explained in the following text.

In optical fibers, the nonlinear effect of "stimulated Brillouin scattering (SBS)" occurs as a function of the injected power of an optical test signal or signal. This narrowband SBS effect with a line width of $\Delta v_B \approx 25$ MHz, which is governed by the phonon life is known (in this context, see Govind P. Algrawal "Nonlinear Fiber Optics", Academic Press, 1995, pages 370 to 375). Furthermore, U.S. Patent Specification U.S. Pat. No. 3,705,992 disclosed the onset threshold for SBS being increased in proportion to the ratio of the spectral width $\Delta v_s$ of the optical signal which is injected into the optical fiber to the line width $\Delta v_B$; that is to say, $$I_{SBS} \sim \Delta v_s / \Delta v_B$$

where $I_{SBS}$=intensity of the injected optical signal at the SBS onset threshold In this case, the governing factor for reaching the SBS onset threshold is the energy which is spectrally integrated in a frequency separation of width $\Delta v_B$. In standard monomode fibers, the SBS onset threshold occurs, for example, at slightly below 10 mW for unmodulated optical signals or test signals, and at a level which is higher by a factor of 2 to 3 dB for binary amplitude-modulated optical signals. The increase for binary amplitude-modulated optical signals is due to the fact that the optical signal power is shared between modulation sidebands and the carrier signal and, particularly at data rates in the Gbit/s range, the power of the data signal is distributed over a broad spectral band.

In the case of amplitude-modulated signals, SBS leads to signal distortion due to overmodulation (see, in particular, H. Kawakani, "Overmodulation of Intensity modulated Signals due to stimulated Brillouin scattering", Electronic Letters, Volume 30, No. 18, pages 1507 to 1508), since the carrier of the amplitude-modulated optical signal, in which the spectral energy density for chip-free modulation is identical to the laser light source, essentially experiences severe additional attenuation due to the SBS.

The SBS onset threshold can be increased considerably by considerably reducing the spectral energy density of the optical signal, integrated over a frequency band of width $\Delta v_B$. Thus, in the case of amplitude-modulated optical signals, the carrier signal power, measured with a resolution of $\Delta v_B$, should be reduced to values which are considerably below the SBS threshold power. A reduction such as this can be achieved by frequency modulation or phase modulation.

The SBS effects in the optical fiber occur essentially within the first 20 km (effective length $L_{eff}$) in a standard monomode fiber. In this case, the optical signal requires the following time:

$$\tau = \frac{L_{eff} \cdot n}{c} (= 0.1 \text{ ms for } L_{eff} = 20 \text{ km})$$

to pass through the effective length $L_{eff}$. In order to reduce SBS effects, the optical injected power per frequency separation $\Delta v_B$, averaged over a time interval, should be very much less than the time $\tau$ spent below the SBS threshold power. This requirement makes it possible to derive the necessary relationship between the modulation shift and the modulation frequency for various forms of modulation, for SBS suppression via frequency modulation and amplitude modulation.

In order to reduce the spectrally narrow carrier line of the optical signal and to uniformly distribute its power over as many lines, which are newly created by the phase modulation, as possible, with a frequency interval of more than $\Delta v_B$, the phase modulation should be carried out using modulation frequencies$>\Delta v_B$. As the phase shift increases, that is to say the modulation index $m = \dfrac{\Delta f_p}{f_m}$ where $\Delta f_p$ = peak frequency error;

$f_m$ = modulation frequency;

the spectral power per frequency separation decreases. Such amplitude modulation in the optical fiber can be produced, for example, by the nonlinear effect of cross-phase modulation (XPM) via the additional injection of highly amplitude-modulated pump signals in addition to the optical signals. In this case, the phase modulation produced by cross-phase modulation (XPM) has an RC low-pass filter response along the optical fiber. The cut-off frequency $\omega_g$ of the "low-pass filter response" decreases linearly as the channel separation increases, owing the dispersion-dependent slip in the WDM transmission channels. In order to achieve effective phase modulation over a broad wavelength band via XPM, it is necessary to choose the magnitude of the modulation frequency to be as low as possible, although this should never be below the line width $\Delta v_B$.

The intensity $I_{SBS}$ of the backscattered optical signal due to SBS at the fiber start increases in the backward direction as the injected optical signal power increases in accordance with the following exponential relationship; in this context, see Govind P. Algrawal "Nonlinear Fiber Optics", 1995, Section 9.2.1:

$$I_{SBS}(0) = I_{SBS}(z) * \exp(g_B * I_S * L_{eff} - \alpha * z) \quad (A\text{-}1)$$

$$L_{eff} = \frac{1}{\alpha^*}(1 - \exp(-\alpha * z)) \quad (A\text{-}2)$$

where

If the amplitude-modulated optical pump signal which produces the XPM and the optical signal propagate simultaneously in the fiber, the optical signal is increasingly phase-modulated on the basis of the XPM as the path length increases. By way of example, phase modulation with a phase shift of 1.435 rad distributes the spectral power of the carrier signal over a number of frequencies in this case; that is to say, for example, uniformly between the carrier wave and the two first sidebands. If the modulation frequency is, in this case, greater than the SBS line width $\Delta v_B$, then only just ⅓ of the spectral energy density is available to form the SBS, for example; that is to say, the SBS onset threshold is increased by a factor of 3 from the point at which such a phase shift is reached by the XPM. The local SBS onset threshold thus can be calculated as a function of the characteristics of the injected modulated pump signal and of the optical fiber, as well as of the injected optical signal, and the SBS onset threshold which results from this and is dependent on the optical pump signal can be determined for the entire fiber.

The SBS onset threshold in the presence of the optical pump signal can be calculated by breaking down the fiber into small part sections in conjunction with equation (A-1). To a first approximation, the fiber is initially broken down into n=2 part sections, from which it follows using equations (A-1) and (A-2) for a fiber of length Z/2 that:

$$I_{SBS}(z/2) = I_{SBS}(z) * \exp(g_B * I_s * \exp(-\alpha^* z/2) * 1/\alpha^* (1 - \exp(-\alpha^* z/2)) - \alpha z/2) \quad (A\text{-}3)$$

and $$I_{SBS}(0) = I_{SBS}(z/2) * \exp(g_B * I_s * 1/\alpha^* (1 - \exp(-\alpha^* z/2)) - \alpha z/2) \quad (A\text{-}4)$$

If the path is broken down into n path sections:

$$I_{SBS}(0) = I_{SBS}(z) * \exp\left[g_B * I_S * \left\{1 + \sum_{k=1}^{n-1} \exp(-\alpha * k/n * z)\right\} * \right. $$
$$\left. 1/\alpha * (1 - \exp(-\alpha * z)) - \alpha z\right] \quad (A\text{-}5)$$

The following text considers the 2nd path section, equation (A-3). Taking account of the spectral change in the optical signal $I_s$ resulting from the XPM which is induced by a sinusoidally amplitude-modulated optical pump signal $I_p$, in the fiber, this results in addition to the path attenuation $\exp(-\alpha^* z/2)$ in a further additional attenuation for the carrier by the attenuation factor:

$$J_0^2(m) = J_0^2(\xi^* \gamma^* I_p^* 1/\alpha^* (1 - \exp(-\alpha^* z/2)), \quad (A\text{-}6)$$

where m is the phase shift or modulation index caused by the XPM on the first path section of length z/2, and $\xi$ is a polarization-dependent constant. For randomly varying polarization: $\xi = 8/9$ Investigations have shown that the carrier of the amplitude-modulated optical pump signal (that is to say $J_0^2(m)$) is substantially included in the change in the intensity of the backscattered optical signal. From this, it follows for equation (A-3) with (A-6):

$$I_{SBS}(z/2)=I_{SBS}(z)*\exp[g_B*I_s*1/\alpha*(1-\exp(-\alpha*z/2))*\exp(-\alpha*z/2)*J_0^2(m(z/2))-\alpha z/2] \quad (A-7)$$

where $$m(x)=\xi*\gamma*I_p*1/\alpha*(1-\exp(-\alpha*x)) \quad (A-8)$$

Substituting equation (A-7) in equation (A-4) gives the intensity of the backscattered optical signal $I_{SBS}$, with approximate consideration of the XPM.

$$I_{SBS}(0)=I_{SBS}(z)*\exp$$
$$[g_B*I_s*\exp(-\alpha*z/2)*J_0^2$$
$$(m(z/2))*1/\alpha**$$
$$(1-\exp(-\alpha*z/2))*1/\alpha*(1$$
$$-\exp(-\alpha*z/2))-\alpha z/2]$$
$$**\exp[g_B*I_s*1/\alpha*(1$$
$$-\exp(-\alpha*z/2))-\alpha z/2]=$$
$$=I_{SBS}(z)*\exp[g_B*I_s*1/\alpha*(1$$
$$-\exp(-\alpha*z/2))**\{1$$
$$+\exp(-\alpha*z/2)*J_0^2(m$$
$$(z/2))\}-\alpha z]$$

In order to improve the accuracy, the fiber is broken down into n subelements (equation A-5)), thus, by an analogous procedure, resulting in:

$$I_{SBS}(0) = I_{SBS}(z)*\exp\left[g_B*I_S*1/\alpha*(1-\exp(-\alpha*z/n))* \right.$$
$$\left. \left\{1+\sum_{k=1}^{n-1}\exp(-\alpha*k/n*z)*J_0^2(m(k*z/n))\right\}-\alpha z\right] \quad (A-9)$$

Comparison of equation (A-9) with equation (A-1) shows that $$L_{eff}=1/\alpha*(1-\exp(-\alpha*z))$$

can be replaced by the expression $$L_{eff}(z,\alpha,\gamma,I_p) = 1/\alpha*(1-\exp(-\alpha*z/n))* \quad (A-10)$$
$$\left\{1+\sum_{k=1}^{n-1}\exp(-\alpha*k/n*z)*J_0^2(m(kz/n))\right\}$$

The effective length $L_{eff}$ is thus, according to equation (A-10) and (A-8), dependent on the nonlinearity coefficient $\gamma$ of the optical fiber, and on the optical power of the amplitude-modulated optical pump signal $I_p$.

Consideration of the Dispersion

If there is a wide frequency separation between the optical pump signal and the injected optical test signal or signals, this results, especially due to the dispersion-dependent slip between the optical signal and the optical pump signal, which occurs in a standard monomode fiber (SSMF), in further dependencies between the effective length $L_{eff}$ and the fiber dispersion, the frequency separation (wavelength separation) of the optical pump signal and optical test signal, and the modulation frequency of the optical pump signal.

From equation (A-10), this results in the following expression for $L_{eff}(z,\alpha,\gamma,I_p)$ for a power section z consisting of n subelements:

$$L_{eff}(z,\alpha,\gamma,I_p,D,\Delta\lambda,f\text{ mod}) = \quad (A-11)$$
$$1/\alpha*(1-\exp(-\alpha*z/n))*\left\{1+\sum_{k=1}^{n-1}\exp(-\alpha*k/n*z)* \right.$$
$$\left. J_0^2(m(kz/n)*Le(k*z/n,\alpha,D,\Delta\lambda,f\text{ mod}))\right\}$$

where $$Le(k*z/n,\alpha,D,\Delta\lambda,f\text{ mod}) \approx$$
$$\left(\frac{1+\exp(-2*L*\alpha)-2*\exp(-L*\alpha)*\cos(L*\beta*\omega)}{\alpha^2+\beta^2*\omega^2}\right)^{\frac{1}{2}}$$

where:
$L=k*z/n$,
$\beta=D*\Delta\lambda$,
$\omega=2*\pi*f\text{mod}$;
$m(kz/n)=\xi*\gamma*I_p*Le$;

$Le(k*z/n,\alpha,D,\Delta\lambda,f\text{mod})$ describes the variation of the modulation index $\{m(kz/n)\}$ interalia also as a function of the modulation frequency and of the wavelength separation between the optical pump signal and the test signal.

For high dispersion values D, high modulation frequencies fmod and wide wavelength separation $\Delta\lambda$, $L_{eff}$ once again assumes its original form from equation (A-2); that is to say, $L_{eff}$ is dependent only on the fiber attenuation $\alpha$ and the location z, and the SBS suppression caused by the optical pump signal is reduced.

The variation in the SBS onset threshold as a function of the pump, signal and fiber parameters is obtained by substitution of equation (A-10) or equation (A-11) in:

$$P_{SBS}=21*A_{eff}/g_B/L_{eff} \quad (A-12)$$

from Godvind P. Agrawal, "Nonlinear Fiber Optics", Academic Press, 1995, formula (9.2.6).

The dispersion D and the nonlinearity coefficient y can be determined from equation (A-11) and equation (A-12) from the variation in the effective length $L_{eff}(z,\alpha,I_p,D,\Delta\lambda,f\text{mod})$ as a function of the optical pump power $I_p$, of the wavelength difference between the pump signal and the test signal $\Delta\lambda$, as well as the modulation frequency fmod and the SBS onset threshold $P_{SBS}$.

Based on the measurement method according to the present invention, the nonlinearity coefficient $\gamma$ and the dispersion D are determined using the shift in the SBS onset threshold $P_{SBS}$ resulting from the change in the spectrum of the injected optical test signal, which is caused by the cross-phase modulation (XPM) resulting from the sinusoidally amplitude-modulated optical pump signal in the optical fiber, using equation (A-12).

In this case, the Brillouin gain constant $g_B$ and the effective area $A_{eff}$ are optical fiber constants, which are naturally available for the optical fiber to be measured, or can be determined without any significant technical effort. However, as already mentioned, the effective length $L_{eff}(z,\alpha,I_p,D,\Delta\lambda,f\text{mod})$ can be influenced by the trial conditions and, based on formula (A-11), depends on the length of the fiber z, on the fiber attenuation $\alpha$, on the wavelength difference between the optical pump signal and test signal Δλ and the modulation frequency fmod of the amplitude-modulated optical pump signal.

In the measurement method according to the present invention for determination of the nonlinearity coefficient γ of an optical fiber, if the wavelength difference between the optical pump signal and the test signal Δλ is, for example, less than 1 nm, and the modulation frequency fmod of the amplitude-modulated optical pump signal is less than 200 MHz, the effect of the dispersion influence on the measurement result can be ignored; that is to say, the effective length $L_{eff}$ does not depend, to a first approximation, on the fiber dispersion D. According to the present invention, a first SBS onset threshold $P_{SBS1}$ and a second SBS onset threshold $P_{SBS2}$, which is shifted owing to the cross-phase modulation (XPM) caused by the injected modulated pump signal in the optical fiber, are measured, and these are evaluated together with the test and pump signal parameters as well as the fiber parameters using equations (A-11) and (A-12), with the dispersion D being negligible. Alternatively, according to the present invention, a first measurement and a second measurement of the backscattered optical power can be carried out, with only the optical test signal being injected into the optical fiber for the first measurement, with a predetermined power and at a predetermined wavelength, and with the modulated optical pump signal in addition to the optical test signal being injected into the optical fiber for the second measurement, in order to produce the cross-phase modulation (XPM). In this case, in both the first measurement and the second measurement, the injected power of the optical test signal is increased until a predetermined ratio is obtained between the injected power of the optical test signal and the backscattered power. The optical test signal and optical pump signal powers used for the first and second measurements in the measurement method, together with the test and pump signal parameters as well as the fiber parameters, are once again evaluated using equations (A-11) and (A-12), with the dispersion D being negligible.

If, in addition to determination of the nonlinearity coefficient γ, it is also intended to determine the dispersion constant D of an optical fiber using the measurement method according to the present invention, then the wavelength difference between the optical pump signal and the test signal Δλ is chosen, by way of example, to be greater than 10 nm; that is to say, the effective length $L_{eff}$ depends on the fiber dispersion D and the wavelength difference between the optical pump signal and test signal Δλ. Based on the measurement method according to the present invention, in addition to the first SBS onset threshold $P_{SBS1}$, without any injected modulated optical pump signal, a third SBS onset threshold $P_{SBS3}$ is determined which has a different profile from the second SBS onset threshold $P_{SBS2}$ owing to the change to the pump signal parameters, or a third measurement is carried out in which, in addition to the optical test signal, the changed modulated optical pump signal is injected into the optical fiber in order to produce the cross-phase modulation (XPM) is used to increase the injected power in the optical test signal until a predetermined ratio is reached between the injected power in the optical test signal and the backscattered power. The detailed procedure of the measurement method according to the present invention and the determination of the nonlinearity constant γ and of the dispersion constant D will be explained in more detail with reference to the following exemplary embodiment.

DETAILED DESCRIPTION OF THE INVENTION

Figure 1:
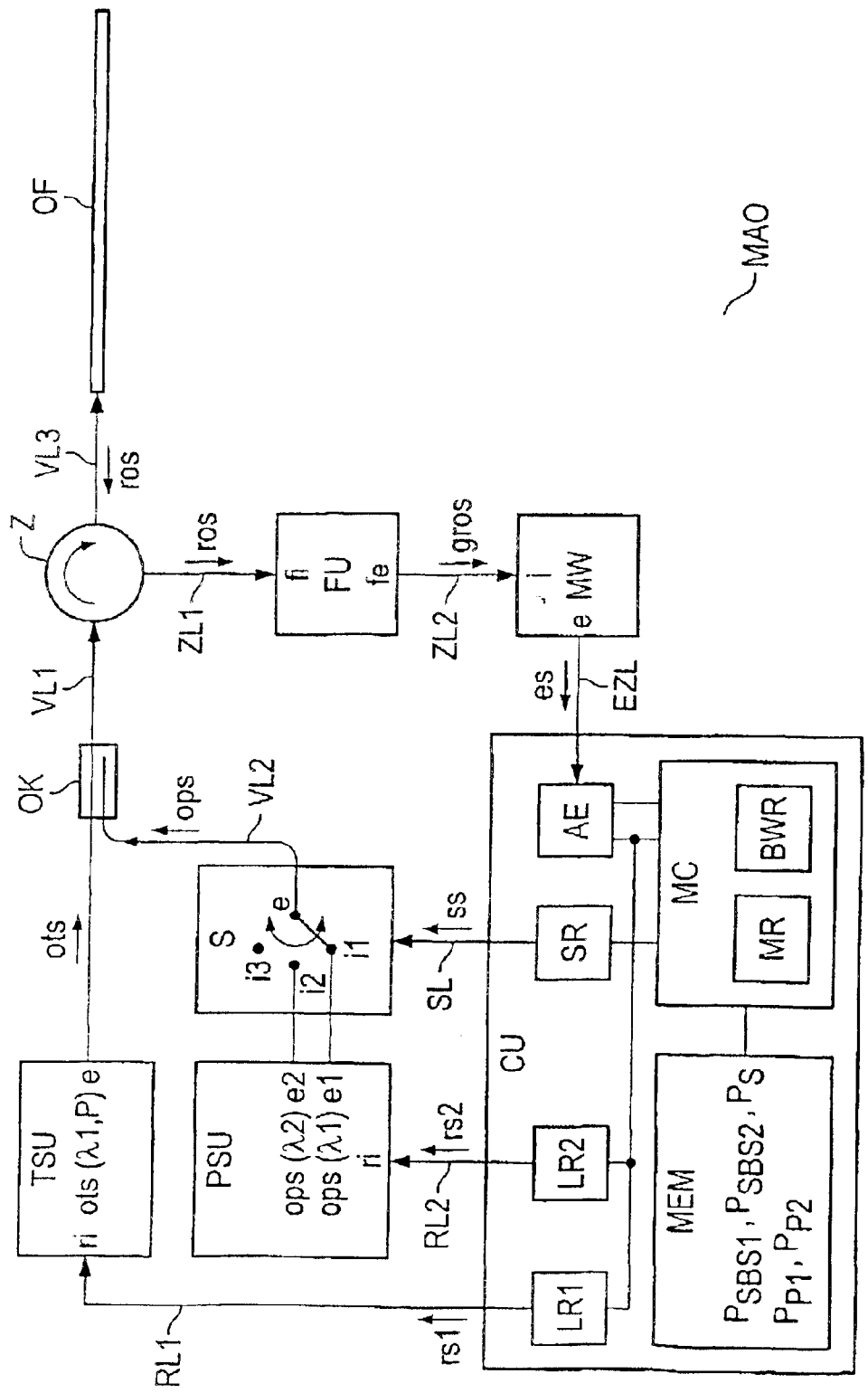
FIG. 1 shows, by way of example, a measurement arrangement for carrying out the measurement method according to the present invention.

By way of example, FIG. 1 uses a block diagram to illustrate a measurement arrangement MAO for carrying out the measurement method according to the present invention for determination of the nonlinearities in an optical fiber OF in which, by way of example, an optical standard monomode fiber OF has been chosen as the test object in FIG. 1. The measurement arrangement MAO illustrated in FIG. 1 has a test signal unit TSU, a pump signal unit PSU, an optical coupler OK, a controllable switching unit S, a circulator Z, a filter unit FU, a measurement transducer MW and a control and evaluation unit CU. The test signal unit TSU has a control input ri and a signal output e, which is connected to the circulator Z via the optical coupler OK and via the first optical connecting line VL1. The optical coupler OK is, in turn, connected via a second optical connecting line VL2 to the output e of the controllable switching unit S. The circulator Z is also connected via a third optical connecting line VL3 to the test object (the optical fiber OF) and via a first supply line ZL1 to the input fi of the filter unit FU, whose output fe is connected via a second supply line ZL2 to the input i of the measurement transducer MW. The output e of the measurement transducer MW is connected via an electrical supply line EZL to the control and evaluation unit CU, which is connected via a control line SL to the control input si of the controllable switching unit S, via a first control line RL1 to the control input ri of the test signal unit TSU, and via a second control line RL2 to the control input ri of the pump signal unit PSU. The pump signal unit PSU furthermore has a first and a second output e1, e2, which are connected to the first and second input i1, i2 of the controllable switching unit S. An optical coupler OK also may be used, for example, instead of the circulator Z (not illustrated in FIG. 1).

The control and evaluation unit CU contains a first power regulator RL1, a second power regulator LR2, a switch-mode regulator SR, a memory unit MEM, an evaluation unit AE and a control unit MC (for example, incorporated in a microprocessor). The memory unit MEM, the first and second power regulators RL1, RL2, the switch-mode regulator SR and the evaluation unit AE are connected to the control unit MC, with the first and second power regulators LR1, LR2 also being connected to the evaluation unit AE. Furthermore, the first power regulator LR1 is connected via the first control line RL1 to the test signal unit TSU, the second power regulator LR2 is connected via the second control line RL2 to the pump signal unit PSU, and the switch-mode regulator SR is connected via the switching line SL to the controllable switching unit S, while the evaluation unit AE is connected via the electrical supply line EZL to the measurement transducer MW.

The measurement method according to the present invention is carried out, for example, on the basis of a measurement routine MR and an assessment routine BWR in the control unit MC, which, inter alia, regulate or control the test signal unit TSU, the pump signal unit PSU and the controllable switching unit S. An optical test signal ots is thus produced in the test signal unit TSU, at a predetermined first wavelength λ1 and with a predetermined power $P_s$, in which case the optical test signal ots also may be amplitude-modulated, for example, with a first modulation frequency v1. According to the present invention, the optical test signal ots is thus injected in modulated form or in unmodulated form into the test object; that is to say, into the optical fiber OF. In the measurement arrangement MAO illustrated in FIG. 1, the optical test signal ots is, for example, transmitted via the optical coupler OK and via the first distributor line VL1 to the circulator Z, and is injected into the optical fiber OF from the circulator Z via the third distributor line VL3. For the first step of the method according to the present invention, only the optical test signal ots is injected into the optical fiber OF; that is to say, the controllable switching unit S does not pass on to the optical coupler OK any of the optical pump signals ops which are produced in the pump signal unit PSU. As such, the controllable switching unit S uses a control command ss which is produced in the control regulator SR to connect the third, unused input i3 of the controllable switching module S to the output e.

The nonlinear effect of "stimulated Brillouin scattering (SBS)" is formed in the optical fiber OF as a function of the injected test signal power $P_s$ of the optical test signal ots. This narrowband nonlinear SBS effect results in a portion of the optical test signal ots being scattered or reflected back in the opposite direction to the injection direction. This backscattered optical signal ros is passed via the circulator Z and via the first supply line ZL1 to the filter input fi of the filter unit FU. In the filter unit PU, such as a bandpass filter with a narrow pass band around the first wavelength λ1 of the optical test signal ots, the backscattered optical signal ros is filtered, and the filtered backscattered signal gros is emitted at the filter output fe. The filtered backscattered signal gros is then transmitted via the second supply line ZL2 to the input i of the measurement transducer MW, such as an optoelectrical transducer, where the measurement transducer MW converts it to an electrical signal es. The electrical signal es is supplied to the control and evaluation unit CU and/or to the evaluation unit AE via the electrical supply line EZL, in which the power $P_{ros}$ of the electrical signal es, and hence of the backscattered optical signal ros, is determined and/or assessed.

The evaluation unit AE, which is controlled by the control unit MC, determines the power $P_{ros}$ of the backscattered optical signal ros, and an assessment routine BWR is used to compare the determined backscattered signal power $P_{ros}$ with the power $P_s$, which is stored in the memory unit MEM, of the optical test signal ots. The first power regulator LR1, controlled by the measurement and assessment routine MR, BWR in the control unit MC, uses the comparison result to form a first control signal rs1 in order to increase or, if appropriate, to reduce the power $P_s$ of the optical test signal ots. In consequence, the power $P_s$ of the optical test signal ots is, for example, increased until a first onset threshold $SBS_1$ for stimulated Brillouin scatter is reached; that is to say, the power $P_{ros}$ of the backscattered signal ros corresponds, for example, to 1/10 of the power $P_s$ of the injected test signal ots. The value of the first critical power, which is emitted at the time when the first onset threshold $SBS_1$ of stimulated Brillouin scatter is reached, and/or the first SBS onset threshold $P_{s1}$ for the optical test signal ots are/is stored in the memory unit MEM in accordance with the measurement routine MR.

According to the present invention, in a second step of the measurement method, in addition to the modulated or unmodulated optical test signal ots, at least one modulated optical pump signal ops is injected into the optical fiber OF with a predetermined first pump signal power $P_{P1}$ and at a first wavelength λ1. For this purpose, an optical pump signal ops is amplitude-modulated with a first wavelength λ1 and, in addition, the optical pump signal ops is amplitude-modulated with a first modulation frequency v1, in the optical pump signal unit PSU, in which case the amplitude modulation may, for example, be in the form of sinusoidal, square-wave or sawtooth-waveform amplitude modulation.

The modulated optical pump signal ops is emitted at the first output e1 of the pump signal unit PSU to the first input i1 of the controllable switching unit S. Based on the second step of the measurement method according to the present invention, the measurement routine MR (which is carried out in the control unit MC) in the switch-mode regulator SR generates a control signal ss in order to connect the first input i1 of the controllable switching unit S to the output e, and this control signal is transmitted via the control line SL to the controllable switching unit S. Once the optical pump signal ops has been connected from the first input i1 to the output e of the controllable switching unit S, the optical pump signal ops is passed via the second distributor line VL2 to the optical coupler OK. The optical coupler OK is used to inject the optical pump signal ops into the first distributor line VL1, and to transmit it, in addition to the optical test signal ots, at the circulator Z. The circulator Z injects the optical test signal ots and the optical pump signal ops into the optical fiber OF via the third optical distributor line VL3.

The additional injection of the modulated optical pump signal ops produces the nonlinear effect of cross-phase modulation (XPM) in the optical fiber OF and, hence, causes phase modulation of the optical test signal ots, which broadens the frequency spectrum of the optical test signal ots. The broadening of the frequency spectrum of the optical test signal ots first of all results in a decrease in the power of the backscattered optical signal ros; that is to say, the portion of the injected optical test signal ots which is scattered or reflected back in the opposite direction to the injection direction as a result of the narrowband nonlinear SBS effect decreases. The backscattered optical signal ros is, in turn, passed via the circulator Z and via the first supply line ZL1 to the filter input fi of the filter unit FU. In the filter unit FU, the backscattered optical signal ros is filtered, and the filtered backscattered signal gros is emitted at the filter output fe. The filtered backscattered signal gros is then once again transmitted via the second supply line ZL2 to the input i of the measurement transducer MW, and the measurement transducer MW converts it to an electrical signal es. The electrical signal es is supplied to the control and evaluation unit CU and/or to the evaluation unit AE via the electrical supply line EZL, in which the power $P_{ros}$ of the electrical signal es, and hence of the backscattered optical signal ros, are determined and/or assessed.

As already described, the evaluation unit AE, which is controlled by the control unit MC, determines the power $P_{ros}$ of the backscattered optical signal ros, and the determined backscattered signal power $P_{ros}$ is compared by the assessment routine BWR with the power $P_s$, which is stored in the memory unit MEM, of the optical test signal ots. The first power regulator LR1, controlled by the measurement and assessment routine MR, BWR in the control unit MC, uses the comparison result to form the first control signal rs1 in order to increase the power $P_s$ of the optical test, signal ots. The power $P_s$ of the optical test signal ots is increased until a second onset threshold $SBS_2$ for stimulated Brillouin scatter is reached, which is higher than the first onset threshold $SBS_1$; that is to say, the power $P_{ros}$ of the backscattered signal ros once again corresponds, for example, to 1/10 of the power $P_s$ of the injected test signal ots. The value of the second critical power $P_{s2}$ and/or of the second SBS onset threshold $P_{SBS2}$ of the optical test signal ots, which is emitted at the time when the second onset threshold $SBS_2$ for stimulated Brillouin scatter is reached, is stored in the memory unit MEM in accordance with the measurement routine MR. Furthermore, the first optical pump signal power $P_{P1}$ that is set at that time is stored in the memory unit MEM.

Figure 2:
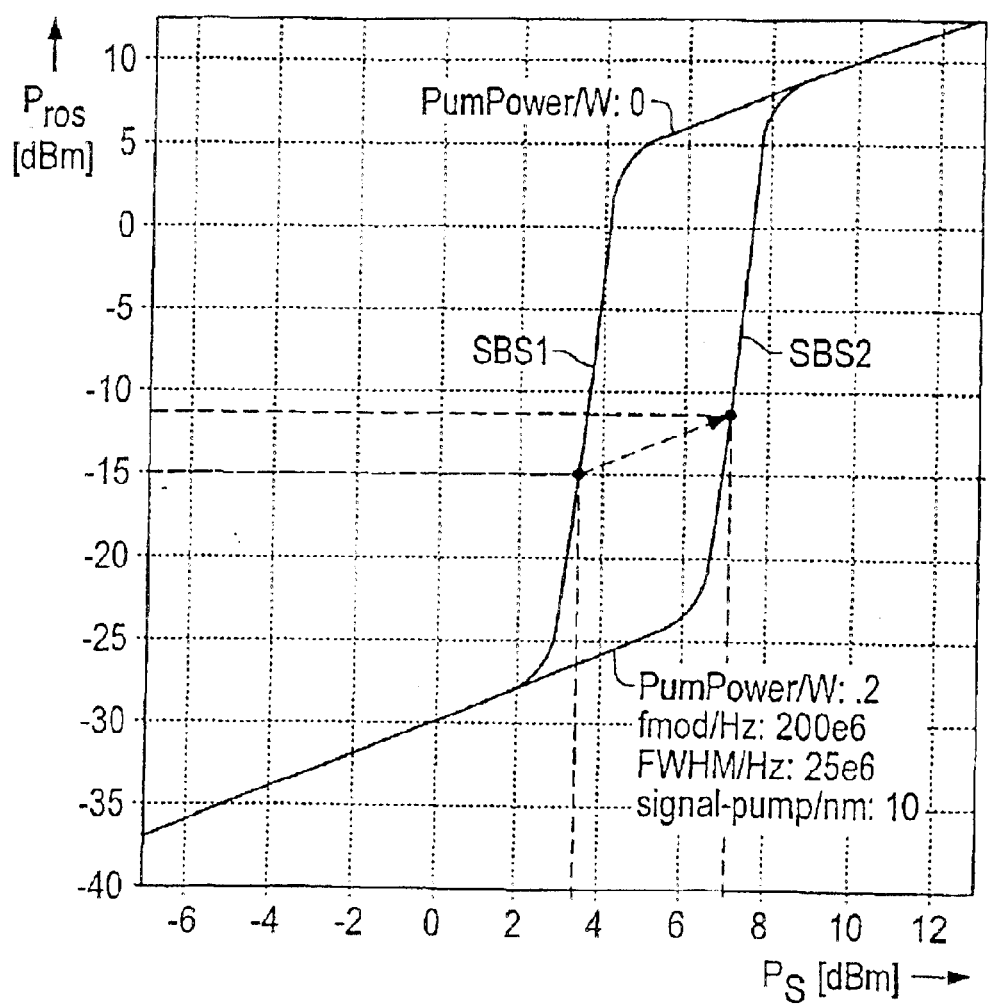
FIG. 2 shows, in a diagram, the shift according to the present invention in the SBS onset threshold.

FIG. 2 uses, by way of example, a diagram to illustrate the first SBS onset threshold $SBS_1$ and the shifted or raised second SBS onset threshold $SBS_2$. The diagram has a horizontal axis (abscissa) and a vertical axis (ordinate), with the power $P_s$ of the injected optical test signal ots being plotted along the horizontal axis, and the power $P_{ros}$ of the backscattered optical signal ros being plotted along the vertical axis, in each case in dBm. Based on the first step of the measurement method according to the present invention, the illustrated first SBS onset threshold $SBS_1$ was measured by injecting the optical test signal ots into the optical fiber OF and by raising the test signal power $P_s$ increasingly, with the change or increase in the power $P_{ros}$ of the backscattered optical signal ros being recorded. The onset of the nonlinear SBS effect can be seen clearly in the diagram shown in FIG. 2 and, by way of example in the illustrated case, occurs at a test signal power $P_s$ of about 0.002 watts. Beyond this critical test signal power $P_s$, it is possible to see a considerably faster rise in the measurement curve for the first measurement method step, and a considerable rise in the power $P_{ros}$ of the backscattered optical signal ros as a result of the SBS. This steep rise of the first SBS onset threshold $SBS_1$ occurs in a test signal power $P_s$ band of about 2 dBm and then flattens out once again, so that the profile of the power $P_{ros}$ of the backscattered optical signal ros with respect to the test signal power $P_s$ assumes approximately the same gradient as immediately before the first SBS onset threshold $SBS_1$. Based on the second step of the measurement method according to the present invention, an optical pump signal ops is injected into the optical fiber OF in addition to the optical test signal ots, so that the cross-phase modulation XPM which occurs in the optical fiber OF results in the SBS onset threshold being shifted to the right; that is to say, the nonlinear SBS effect occurs at a higher injected test signal power $P_s$. By way of example, for the measurement curve which is illustrated in the diagram and contains the second SBS onset threshold $SBS_2$, an optical pump signal ops was injected into the optical fiber OF in such a way that amplitude modulation was carried out with a modulation frequency of 20 MHz, and the pump signal power was 0.2 watts. Furthermore, the wavelength difference $\Delta\lambda$ between the optical test signal ots and the optical pump signal ops was approximately 10 nm. The approximately 2 dBm shift in the SBS onset threshold which can be seen from the diagram is evaluated together with the known test and pump signal parameters as well as the known fiber parameters in order to determine the nonlinearity coefficient γ. A shift of 1 to 3 dB in the SBS onset threshold is required, by way of example, for unique evaluation of the SBS onset thresholds for the purpose of determination of the nonlinearity coefficient γ according to the present invention.

As has already been indicated in the part of the description which covers the theoretical principles for understanding of the present invention, the increase in the SBS onset threshold from $SBS_1$ to $SBS_2$, which was 2 dB in the example, is represented, by way of example, by combination of the equations (A-11, A-12) and by forming the ratio of the measurement values of the two measurement curves which are illustrated in FIG. 2, as a function of the product of the polarization-dependent constant ξ, of the nonlinearity constant γ and of the injected pump power $P_{P1}$, $P_{P2}$, and the product of the dispersion constant D, the wavelength difference $\Delta\lambda$ and the modulation frequency fmod. Such an evaluation of the measurement curves illustrated in FIG. 2 is illustrated by way of example in the form of a diagram in FIG. 3, in particular with a third measurement curve, which is not illustrated in FIG. 2, being evaluated in FIG. 3. The diagram shows a first, a second and a third measurement curve MK1, MK2, MK3, which are determined from the known measurement parameters determined according to the present invention. For this purpose, the diagram has a horizontal axis (abscissa) and a vertical axis (ordinate), with the product of the polarization-dependent constant ξ, the nonlinearity constant γ and the respectively injected pump power $P_{P1}$, $P_{P2}$ ξ*γ*$P_p$, being plotted on a logarithmic scale along the horizontal axis, and with the product of the dispersion constant D, the wavelength difference $\Delta\lambda$ and the modulation frequency fmod D*$\Delta\lambda$*fmod being plotted along the vertical axis. The illustrated measurement curves MK1, MK2, MK3 are obtained for a 100 km long optical fiber OF with an attenuation constant of 0.2 dB, with the product ξ*γ* $P_p$ which is plotted on the abscissa having a value range for the pump power $P_p$ of about 0.1 to 2 watts, and the product D*$\Delta\lambda$*fmod which is plotted on the ordinate having a value range for the wavelength separation $\Delta\lambda$ around 10 nm, for a modulation frequency of 0 to 1 GHz. The first measurement curve MK1 represents an increase of 1 dB in the first SBS onset threshold $SBS_1$, the second measurement curve represents an increase of 2 dB, and the third measurement curve represents an increase of 3 dB, with the pump signal power $P_p$ injected into the optical fiber accordingly being increased from 0.1 watts to 0.2 watts in each for this purpose. Furthermore, a first, a second, a third and a fourth measurement point MP1 to MP4 are marked along the second and third measurement curves MK2, MK3 in FIG. 3, and these are the measurement points which are selected, by way of example, for determination of the nonlinearity constant γ and of the dispersion constant D using an iterative evaluation method. For the measurement method according to the present invention for determination of the nonlinearities in the optical fiber OF, it is sufficient in itself to determine at least two measurement values. In the illustrated exemplary embodiment, however, a more comprehensive representation of the method according to the present invention is preferred.

Figure 3:
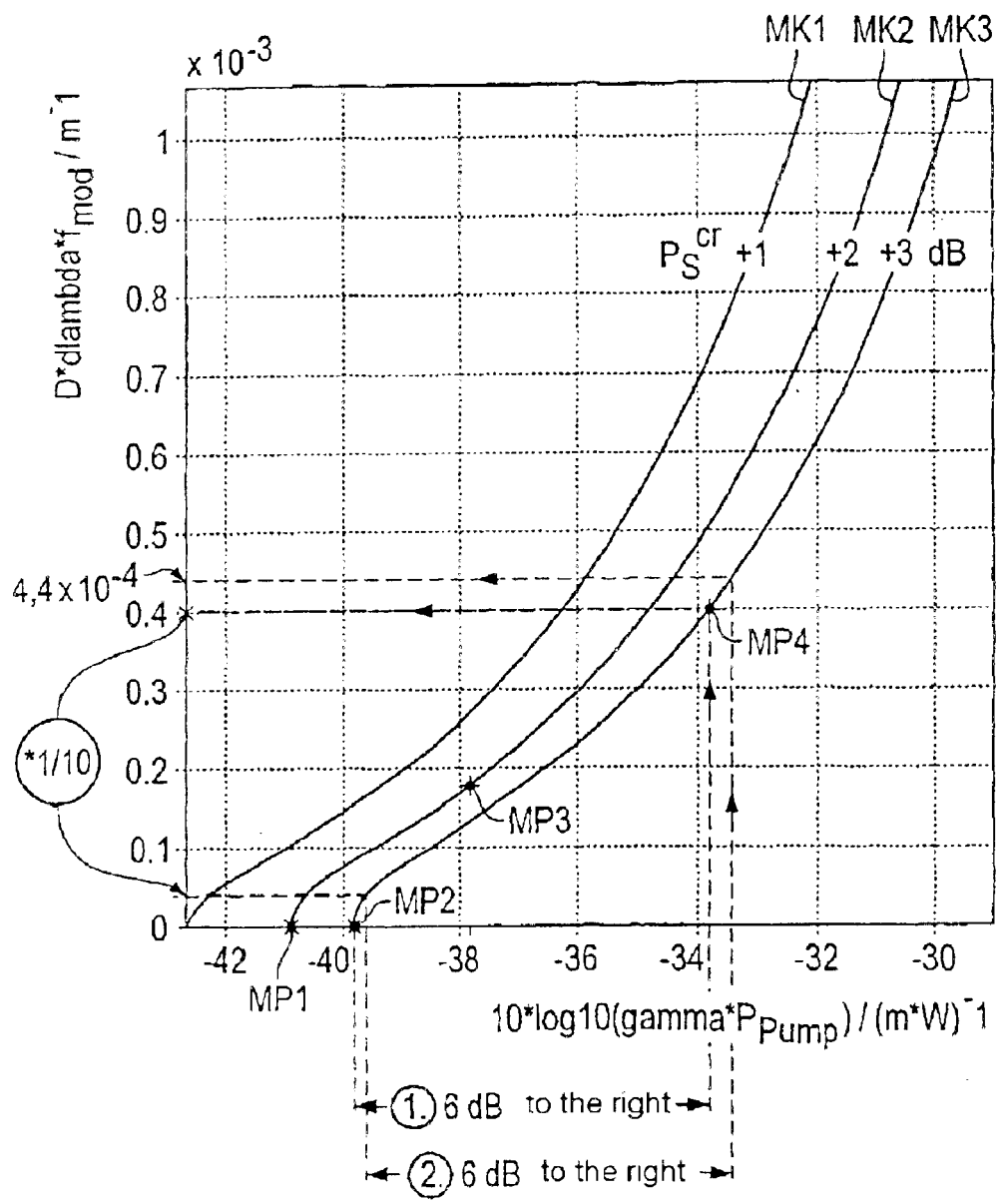
FIG. 3 shows, in a further calculated diagram, the measurement method according to the present invention for determining of the nonlinearity constants and dispersion constants.

In order to determine the nonlinearity coefficient γ, the measurement values which are stored in the memory unit MEM and include the first and second test signal powers $P_{S1}$, $P_{S2}$, the first pump signal power $P_{P1}$ as well as the measurement curves illustrated in FIG. 2 and FIG. 3 are evaluated using the assessment routine BWR which is carried out in the control unit MC. With a wavelength difference $\Delta\lambda$ of around 1 nm between the optical test signal ots and the optical pump signal ops, and with a low modulation frequency fmod around 200 MHz, the dispersion influence on the measurement result is negligible, so that, according to equation (A-12), the effective length $L_{eff}$ does not, to a first approximation, depend on the dispersion constant D, and it is thus possible to determine the nonlinearity constant γ, using the assessment routine BWR, by evaluation of equation (A-12).

The second measurement curve MK2 illustrated in FIG. 3, in particular the first measurement point MP1, will be used by way of example to explain the process for determination of the nonlinearity constant γ using the assessment routine. The first measurement point MP1 denotes the intersection of the second measurement curve MK2 with the abscissa in FIG. 3, which thus takes account of the negligible dispersion constant D and of the small wavelength difference Δλ for the situation under consideration. A negligible ordinate value and a logarithmic abscissa value (10*log10) of −40.9 l/m/W thus can be read as the coordinates of the first measurement point MP1 from the diagram in FIG. 3. The first pump signal power $P_{P1}$, which is stored in the memory unit MEM is in this case 20 dBm, which corresponds to a first pump signal power $P_{P1}$ of 100 mW. Thus, taking account of the polarization-dependent constant ξ=1, this results in a nonlinearity constant γ of 0.000813 l/mW after the following conversions:

$$10*\log 10(\gamma * P_{P1}) = -40.9 \text{ l/m/W}$$

$$\gamma * P_{P1} = 8.13 * 10^{-5} \text{ l/m/W}$$

$$\gamma = 0.000813 \text{ l/m/W}$$

The nonlinearity constant γ can be determined in an analogous manner, using the assessment routine BWR, by way of example at the intersection of the third measurement curve MK3 with the abscissa of the diagram illustrated in FIG. 3.

A process for determining the dispersion characteristics, that is to say the dispersion constant D, of the optical fiber OF will be carried out in the following text according to the present invention, such that, in a third step, the amplitude-modulated optical pump signal ops is injected, in addition to the optical test signal ots, into the optical fiber OF with the first pump signal power $P_{P1}$ and at a second pump wavelength λ2 and, a third shifted onset threshold $SBS_3$ for stimulated Brillouin scatter is once again determined by changing the power of the backscattered optical signal ros, by increasing the first pump signal power $P_{P1}$ until the power $P_{ros}$ of the backscattered signal ros once again corresponds, for example, to ⅒ of the power $P_s$ of the injected test signal ots. As such, if the wavelength difference Δλ between the optical test signal ots and the second optical pump signal ops2 is increased, by way of example, from 1 to 10 nm in the third step, then the first pump power $P_{P1}$, must be increased by 3 dB in order once again to obtain the second SBS onset threshold $SBS_2$. This results in a second optical pump signal power $P_{P2}$ for increasing the wavelength difference Δλ in order to reach the second SBS onset threshold $SBS_2$ or, in other words: the increased wavelength difference Δλ between the optical test signal ots and the second optical pump signal ops2 means that the dispersion affects the measurement result in such a way that the first optical pump signal power $P_{P1}$ must be increased in order to reach the second SBS onset threshold $SBS_2$.

This technical effect is evaluated as follows, according to the present invention, in order to determine the dispersion constant D. Assuming a polarization-dependent constant ξ=1, the measurement curves illustrated in FIG. 3, in particular the first and third measurement curves MK1, MK3, are used for the determination process via the assessment routing BWR. A first measured pump signal power $P_{P1}$ of 20 dBm was evaluated in order to calculate the first measurement curve MK1, and a third measured pump signal power $P_{P3}$ of 26 dBm was evaluated in order to calculate the third measurement curve MK3, corresponding to an increase in the pump power $P_p$ of 6 dB in order to compensate for the increase in the wavelength difference Δλ, that is to say, with a first optical pump signal ops1 at a first pump wavelength Δλ, by way of example, a first pump signal power $P_{P1}$ is required in order to reach the second SBS onset threshold $SBS_2$, and a second pump signal power $P_{P2}$, which is greater by a factor of 6 dB, is required when using a second optical pump signal ops2 at a higher, second pump wavelength $\lambda_2$. The third measurement curve MK3 which is obtained in this way and is shifted to the right in the diagram in comparison to the first measurement curve MK1 is evaluated starting at the second measurement point MP2 in order to determine the dispersion constant D using an iterative evaluation method. For this purpose, the data record which represents the third measurement curve MK3 and which is stored in the memory unit MEM is evaluated using the assessment routine BWR such that the intersection between the abscissa and the third measurement curve MK3 is first of all selected as the second measurement point TP2 and, starting from the abscissa value of the second measurement point MP2, the abscissa value of the fourth measurement point is determined from the data record by shifting to the right, or reducing, the abscissa value of the second measurement point MP2 by the magnitude of the increase in the pump signal power $P_P$, that is to say, 6 dB in the exemplary embodiment under consideration. The associated ordinate value of the fourth measurement point MP4 is determined from this.

Based on the difference (as considered in the exemplary embodiment) between the first product of the dispersion constant D, the first wavelength difference Δλ1 and the modulation frequency fmod D*Δλ1*fmod for the first measurement curve MK1 and the second product of the dispersion constant D, the second wavelength difference Δλ2 and the modulation frequency fmod D*Δλ2*fmod for the third measurement curve MK3 of 10, the first measurement point MP1, or starting point, for the iterative assessment method was not sufficiently precise, and is improved as follows. The previously determined ordinate value of the fourth measurement point MP4 is divided by the difference between the first and the second product, the factor 10, and a new improved ordinate value is thus determined for the first measurement point MP1. The database is used to determine the associated new, improved abscissa value for the first measurement point MK1 with respect to the new, improved ordinate value, and is stored in the memory unit MEM for further processing. Based on the first iteration step, the new, improved abscissa value for the second measurement point MP2 is in turn shifted to the right, or reduced, by the magnitude of the increase in the pump signal power $P_P$, that is to say by 6 dB in the exemplary embodiment under consideration, in a second run of the iterative assessment method. An improved ordinate value for the new fourth measurement point MP4 which results in this case, is determined from this. In the majority of applications, this assessment method converges after a small number of iterations, so that the ordinate value which is obtained for the fourth measurement point MP4 can be used for determination of the dispersion constant in accordance with the following equation:

$$D = 4.4*10^{-4}/(\Delta\lambda * \text{fmod}) =$$

$$= 4.4*10^{-4}/(10^{-8} * 2 * 10^{8}) \text{ps/nm/km} =$$

$$D = 220 \text{ ps/nm/km}$$

A dispersion constant of D=220 ps/nm/km is thus obtained for the described exemplary embodiment. The second measurement curve may be evaluated in an analogous manner, by way of example, in order to determine the associated dispersion constant D.

The measurement arrangement according to the present invention is in no way restricted to a transmission-end implementation, but may be used for any desired optical transmission media, at the receiving end as well.

Indeed, although the present invention has been described with reference to specific embodiments, those of skill in the art will recognize that changes may be made thereto without departing from the spirit and scope of the present invention as set forth in the hereafter appended claims.

What is claimed is:

1. A measurement method for determining nonlinearities in an optical fiber, the method comprising the steps of:
   injecting, in a first step, at least one optical test signal (ots) having a varying test signal power ($P_s$) into the optical fiber;
   determining a first onset threshold ($SBS_1$) for stimulated Brillouin scatter based on a change in power ($P_{ros}$) of a backscattered optical signal (ros);
   injecting, in a second step, in addition to the optical test signal (ots), at least one modulated optical pump signal (ops) with a predetermined pump signal power ($P_{P1}$) and at a first pump wavelength ($\lambda_1$) into the optical fiber;
   determining a second onset threshold ($SBS_2$) for the stimulated Brillouin scatter based on a change in the test signal power ($P_s$); and
   determining a nonlinearity coefficient ($\gamma$) of the optical fiber by evaluating at least the first and the second onset thresholds ($SBS_1$, $SBS_2$), test and pump signal parameters and fiber parameters.

2. A measurement method for determining nonlinearities in an optical fiber as claimed in claim 1, wherein a test signal wavelength ($\lambda_1$), the predetermined pump signal power ($P_{P1}$), the first pump wavelength ($\lambda_1$) and a modulation frequency ($\upsilon_1$) of the optical pump signal (ops) are evaluated as the test and pump signal parameters.

3. A measurement method for determining nonlinearities as claimed in claim 2, wherein the test signal wavelength ($\lambda_1$) and the first pump wavelength ($\lambda_1$) have a wavelength difference of less than 1 nm.

4. A measurement method for determining nonlinearities in an optical fiber as claimed in claim 2, the method further comprising the steps of:
   injecting, in a third step, in addition to the optical test signal (ots), the modulated optical pump signal (ops) with the predetermined pump signal power ($P_{P1}$) and at a second pump wavelength ($\lambda_2$) into the optical fiber;
   determining a third shifted onset threshold (MK3) of the stimulated Brillouin scatter again by a change in the power ($P_{ros}$) of the backscattered optical signal (ros); and
   determining a dispersion constant (D) of the optical fiber by additionally evaluating at least the second and the third onset thresholds ($SPS_1$, MK3), the test wavelength ($\lambda_1$), the pump signal power ($P_{P1}$), the first and the second pump wavelengths ($\lambda_1$), ($\lambda_2$), the modulation frequency ($\upsilon_1$) of the optical pump signal (ops) and the fiber parameters.

5. A measurement method for determining nonlinearities in an optical fiber as claimed in claim 4, wherein the first, second and third onset thresholds ($SBS_1$, $SBS_2$, MK3) of the stimulated Brillouin scatter are each determined via the test signal power ($P_s$) which causes the onset of the stimulated Brillouin effect.

6. A measurement method for determining nonlinearities in an optical fiber as claimed in claim 4, wherein the modulation frequency ($\upsilon_1$) of the optical pump signal (ops) is chosen to be higher than an SBS line width ($\Delta\upsilon_B$).

7. A measurement method for determining nonlinearity in an optical fiber as claimed in claim 1, wherein the fiber parameters that are taken into account in the evaluation are an effective fiber length ($L_{eff}$), an attenuation constant ($\alpha$), a polarization factor ($\xi$) for randomly varying polarization and a Brillouin gain factor ($g_B$) of the optical fiber.

8. A measurement method for determining nonlinearities in an optical fiber as claimed in claim 1, wherein the optical pump signal (ops) is modulated via at least one of sinusoidal, square-wave and sawtooth-waveform amplitude modulation.

9. A measurement method for determining nonlinearities in an optical fiber as claimed in claim 1, wherein the evaluation is carried out in accordance with the formula:

$$P_s^{cr} = 21 * A_{eff} / g_B / L_{eff} \text{ and}$$

$$L_{eff}(z, \alpha, \gamma, I_p, D, \Delta\lambda, fmod) =$$

$$1/\alpha * (1 - \exp(-\alpha * z/n)) * \left\{ 1 + \sum_{k=1}^{n-1} \exp(-\alpha * k/n * z) * J_0^2(m(kz/n) * Le(k * z/n, \alpha, D, \Delta\lambda, f \bmod)) \right\}$$

where $$\left( \frac{1 + \exp(-2 * L * \alpha) - 2 * \exp(-L * \alpha) * \cos(L * \beta * \omega)}{\alpha^2 + \beta^2 * \omega^2} \right)^{\frac{1}{2}}$$

where:

$L = k*z/n$, $\beta = D*\Delta\lambda$, $\omega = 2*\pi*\text{fmod}$;

$m(kz/n) = \xi*\gamma*I_p*Le$;

and where:
   $P_s^{cr}$ = backscattered power at the onset threshold of SBS,
   $g_B$ = a Brillouin gain constant,
   $A_{eff}$ = an effective area,
   $L_{eff}$ = an effective length,
   Z = a location variable,
   $\alpha$ = a fiber attenuation constant,
   D = a dispersion constant,
   $\Delta\lambda$ = a wavelength difference between the test signal and the pump signal,
   fmod = a modulation frequency of the pump signal,
   $I_p$ = a pump power of the injected pump signal,
   n = a number of subelements for the approximation,
   $\gamma$ = a nonlinearity coefficient,
   $\xi$ = a polarization-dependent constant.

* * * * *